United States Patent
Miyoshi

(10) Patent No.: US 7,886,107 B2
(45) Date of Patent: Feb. 8, 2011

(54) DATA PROCESSOR, DATA PROCESSING METHOD, AND COMPUTER READABLE MEDIUM STORING PROGRAM THEREFOR

(75) Inventor: Nobukazu Miyoshi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 864 days.

(21) Appl. No.: 11/648,639

(22) Filed: Jan. 3, 2007

(65) Prior Publication Data

US 2007/0245100 A1    Oct. 18, 2007

(30) Foreign Application Priority Data

Apr. 3, 2006    (JP) ............................. 2006-101919

(51) Int. Cl.
*G06F 12/00* (2006.01)

(52) U.S. Cl. ............... 711/103; 711/156; 711/E12.006; 711/E12.008

(58) Field of Classification Search ................ 711/163, 711/164, 159, 103, 156, E12.008, E12.006; 365/189
See application file for complete search history.

(56) References Cited

U.S. PATENT DOCUMENTS

| | | | | |
|---|---|---|---|---|
| 5,530,827 A | * | 6/1996 | Matsui et al. | ............... 711/103 |
| 5,933,847 A | * | 8/1999 | Ogawa | ................. 711/103 |
| 6,604,168 B2 | * | 8/2003 | Ogawa | ................. 711/103 |
| 6,898,680 B2 | * | 5/2005 | Chambers | ................. 711/159 |
| 6,967,909 B2 | * | 11/2005 | Van Den Enden et al. | .. 369/47.1 |
| 7,038,991 B1 | * | 5/2006 | Spruit et al. | ............. 369/59.24 |
| 2004/0015649 A1 | * | 1/2004 | Chang | ................. 711/103 |
| 2004/0027603 A1 | | 2/2004 | Ueda et al. | |
| 2004/0202024 A1 | * | 10/2004 | Shinagawa et al. | ...... 365/185.29 |
| 2005/0201153 A1 | * | 9/2005 | Swaminathan | ......... 365/185.11 |
| 2006/0155917 A1 | * | 7/2006 | Di Sena et al. | ............. 711/103 |
| 2006/0236025 A1 | * | 10/2006 | Eldar | ................. 711/103 |
| 2007/0245068 A1 | * | 10/2007 | Yero | ................. 711/103 |

FOREIGN PATENT DOCUMENTS

| | | |
|---|---|---|
| JP | A-2004-072139 | 3/2004 |
| JP | A 2005-18567 | 1/2005 |
| JP | A-2005-313567 | 11/2005 |
| JP | A-2005-313568 | 11/2005 |

OTHER PUBLICATIONS

Jun. 2, 2010 Office Action issued in Japanese patent application No. 2006-101919 (with translation).

* cited by examiner

*Primary Examiner*—Pierre-Michel Bataille
(74) *Attorney, Agent, or Firm*—Oliff & Berridge, PLC

(57) ABSTRACT

A data processor that erases data stored in a storage device includes an erase information storage unit that stores an erase information indicating a description of an erasing process having been performed, corresponding to an erase-specified area, after the erasing process for the erase-specified area, being an area specified to be subjected to the erasing process, is performed.

18 Claims, 4 Drawing Sheets

DATA PROCESSOR, DATA PROCESSING METHOD, AND COMPUTER READABLE MEDIUM STORING PROGRAM THEREFOR

BACKGROUND

1. Technical Field

The present invention relates to a data processor and a data processing method for storing data to be processed in a storage device, and performs an erasing process to erase the processed data stored in the storage device after the data is processed, as well as a computer readable medium storing a program therefor.

2. Related Art

In recent years, an image processor, such as a copy machine and a printer, employs a hard disk as a storage device to hold image data. However, if such an image processor is discarded together with the hard disk, there is a problem that information held within the discarded hard disk may leak out. Therefore, a need for erasing unnecessary information within the hard disk is growing, and various ways have been proposed as a method to erase the information in the hard disk.

As an example of such erasing method, it is disclosed that dummy data is prepared (overwriting data) to overwrite a memory at a preset timing such as during intervals between print jobs, and a hard disk area to be subjected to erasing is overwritten by the dummy data.

However, in a storage device that magnetically stores data, such as a hard disk, there is a possibility that overwriting only once does not completely erase the data beneath. It is because the contents of the hard disk may be restored by dismantling a HDD (hard disk drive) and reading residual magnetism on the disk by a particular kind of reader.

Therefore, there is generally known a method to erase data on a HDD, which is recommended by the US National Security Agency (NSA). In this method, overwriting three times is performed; the first and the second overwriting are performed with a random number, and the third overwriting is performed with a fixed value. There is also known an alternative method in general, which further improves the erasing effect by increasing overwriting times.

However, depending on data amount to be erased or how it is erased, it may take an enormously long time for erasing, or a long period of time may be required after a certain process is finished until a subsequent process is ready to be performed. Furthermore, since this erasing process has a certain effect on other jobs, it may cause a deterioration of performance in the entire system.

SUMMARY

The present invention aims to provide a data processor, a data processing method, and a computer readable medium storing a program, which reduce the time for erasing data, thereby enhancing processing efficiency.

According to an aspect of the present invention, there is provided a data processor that erases data stored in a storage device, including an erase information storage unit that stores an erase information indicating a description of an erasing process having been performed, corresponding to an erase-specified area, after the erasing process for the erase-specified area, being an area specified to be subjected to the erasing process, is performed.

BRIEF DESCRIPTION OF THE DRAWINGS

Exemplary embodiments of the present invention will be described in detail based on the following figures, wherein.

DETAILED DESCRIPTION

In order to facilitate the understanding of the present invention, a background and overview thereof will be explained.

As described above, if data stored in a hard disk is to be completely erased, it is necessary to perform overwrite erasing more than once. Therefore, if an area to be subjected to the erasing process is wide, or the number of overwriting times being required is large, the time for the erasing process may be enormously long. For example, in the case where one wants to discard a hard disk and tries to completely erase whole data in the hard disk, an enormously long time for erasing process is necessary. Also in a situation other than discarding the hard disk, such as specifying all or some of segments in the hard disk to erase the data within the specified segment, the time for erasing process may be enormously long.

However, the hard disk may contain a segment already subjected to the erasing process before. Therefore, if the erasing process being directed is performed targeting the entire area including such segment, it may result in a redundant erasing process.

In view of the situation above, in the exemplary embodiment of the present invention, a description of the erasing process previously performed is stored as erase information, and only a difference between a directed erasing process and the erasing process previously performed is made to be subjected to the erasing process being directed, thereby reducing the time of erasing process.

Next, an aspect of the invention will be explained in detail, with reference to the accompanying drawings.

First Exemplary Embodiment

Figure 1:
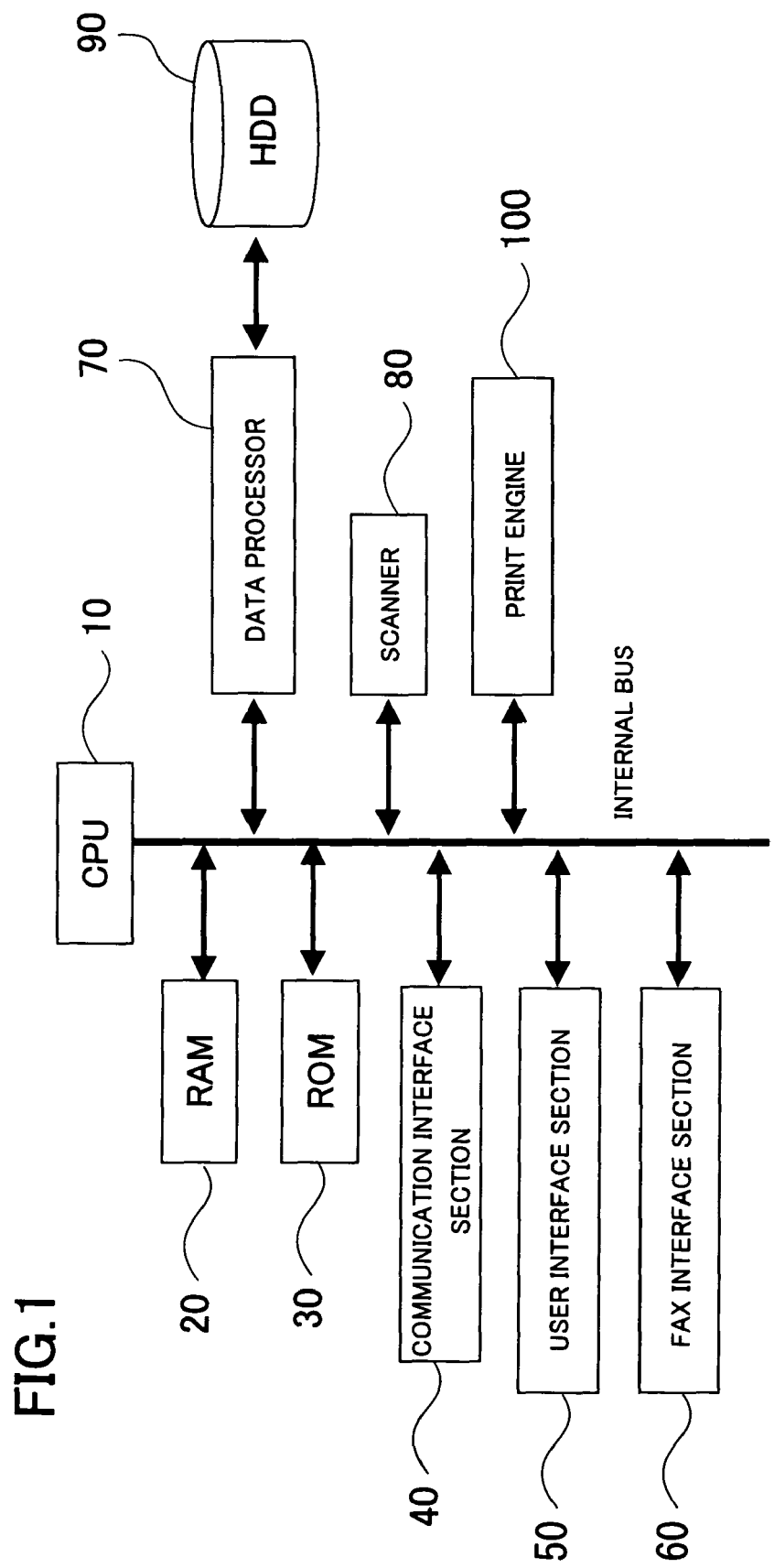
FIG. 1 is a block diagram showing a hardware configuration of an image processor having a data processor according to a first exemplary embodiment of the present invention.

FIG. 1 illustrates a hardware configuration of an image processor having the data processor 70 according to the first exemplary embodiment of the present invention, centering on the data processor 70.

As shown in FIG. 1, the image processor according to an exemplary embodiment of the present invention incorporates a CPU 10, a RAM 20, a ROM 30, a communication interface section 40, a user interface section 50, a FAX interface section 60, a data processor 70, a scanner 80, a HDD (Hard Disk Drive) 90, and a print engine 100.

The communication interface section 40 establishes communication with other equipment. The user interface section 50 performs user interface processing such as inputting settings from a user, and display processing for the user. The FAX interface section 60 establishes FAX communication via a phone line with other FAX machine.

The print engine 100 performs a process to print image data and the like that has been processed in the data processor 70. The CPU 10 controls operations of the RAM 20, ROM 30, communication interface section 40, user interface section 50, FAX interface section 60, data processor 70, scanner 80, and print engine 100.

The data processor 70 is a general-purpose computer on which a data processing program is installed, and performs predetermined data processing on image data and the like captured via the scanner 80, according to a directive from the CPU 10. In performing the data processing, the data processor 70 once stores the image data to be subjected to the processing in the HDD 90 as a storage device, and then performs the data processing being specified by the CPU 10.

The data processing program is read from a recording medium such as a magnetic disk and a semiconductor memory, not illustrated, into the data processor 70, and installed therein, thereby controlling the operation of the data processor 70.

Alternatively, hardware such as ASIC (Application Specific IC) may implement all or some of the functions that are implemented by the data processing program.

Figure 2:
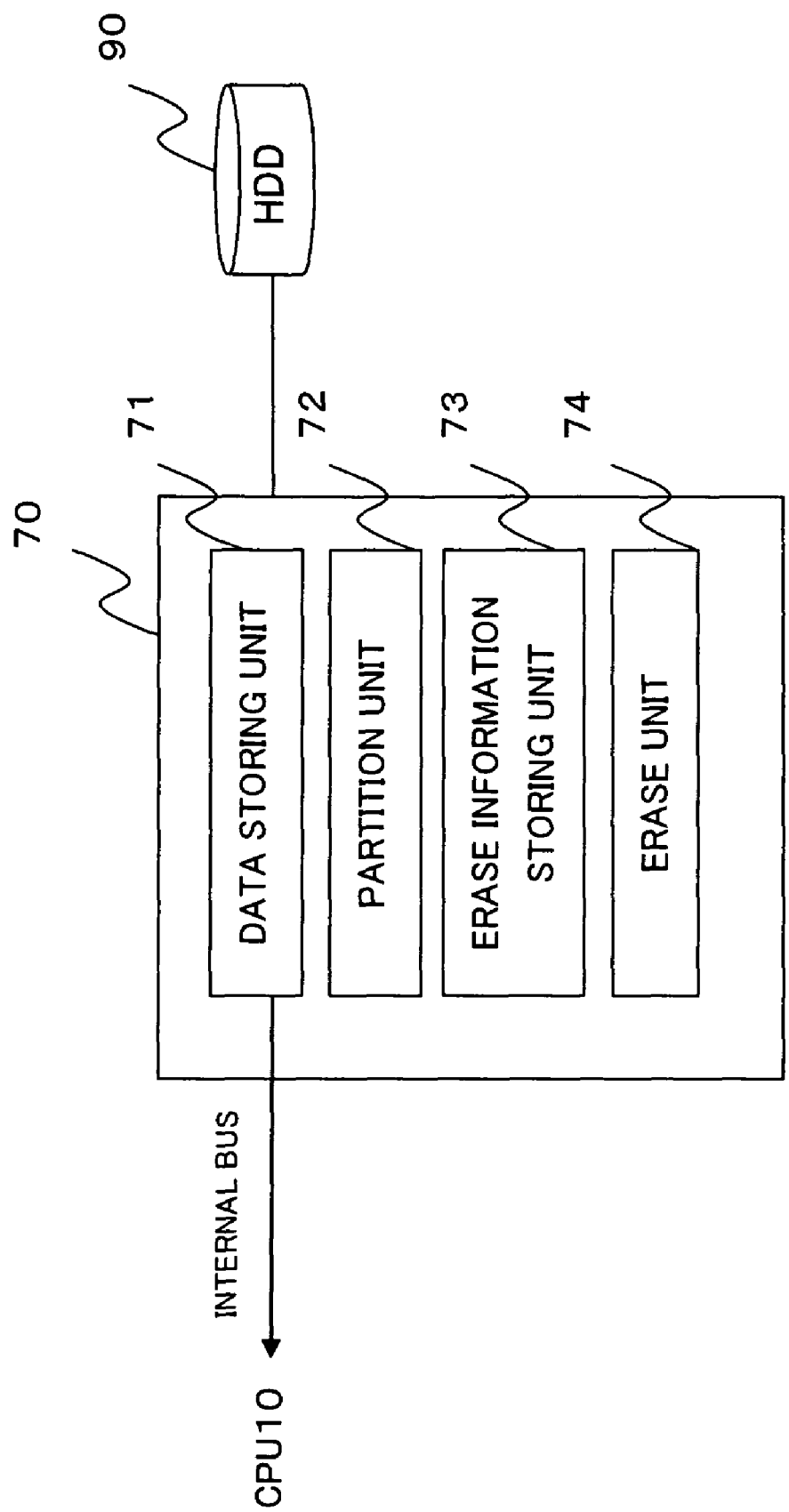
FIG. 2 is a block diagram showing an example of a functional configuration of a data processor 70 as shown in FIG. 1.

FIG. 2 illustrates an example of a functional configuration of the data processor 70 as shown in FIG. 1, which is implemented by executing the above data processing program.

As shown in FIG. 2, the data processor 70 is provided with a data storing unit 71, a partition unit 72, an erase information storing unit 73, and an erase unit 74. In the data processor 70, the data storing unit 71 stores image data and the like captured via the scanner 80, into the HDD 90 that is a storage device. After the data processing is performed and there is a directive from the CPU 10 to erase the processed data, the partition unit 72 partitions an erase-specified area into multiple segments, the erase-specified area being an area specified to be subjected to the erasing process. After the erasing process is performed for each of the segments, the erase information storing unit 73 stores erase information each indicating a description of the erasing process having been performed, in such a manner as being associated with the segments, respectively. In the exemplary embodiment of the present invention, the erase information storing unit 73 stores the erase information in the head of the data within each segment.

Then, when there is a directive to erase the memory area of the HDD 90, the erase unit 74 reads the erase information from each segment within the erase-specified area, and performs the erasing process for a difference between the erasing process being directed and an already-performed erasing process indicated by the erase information being read, with respect to each segment.

Figure 3:
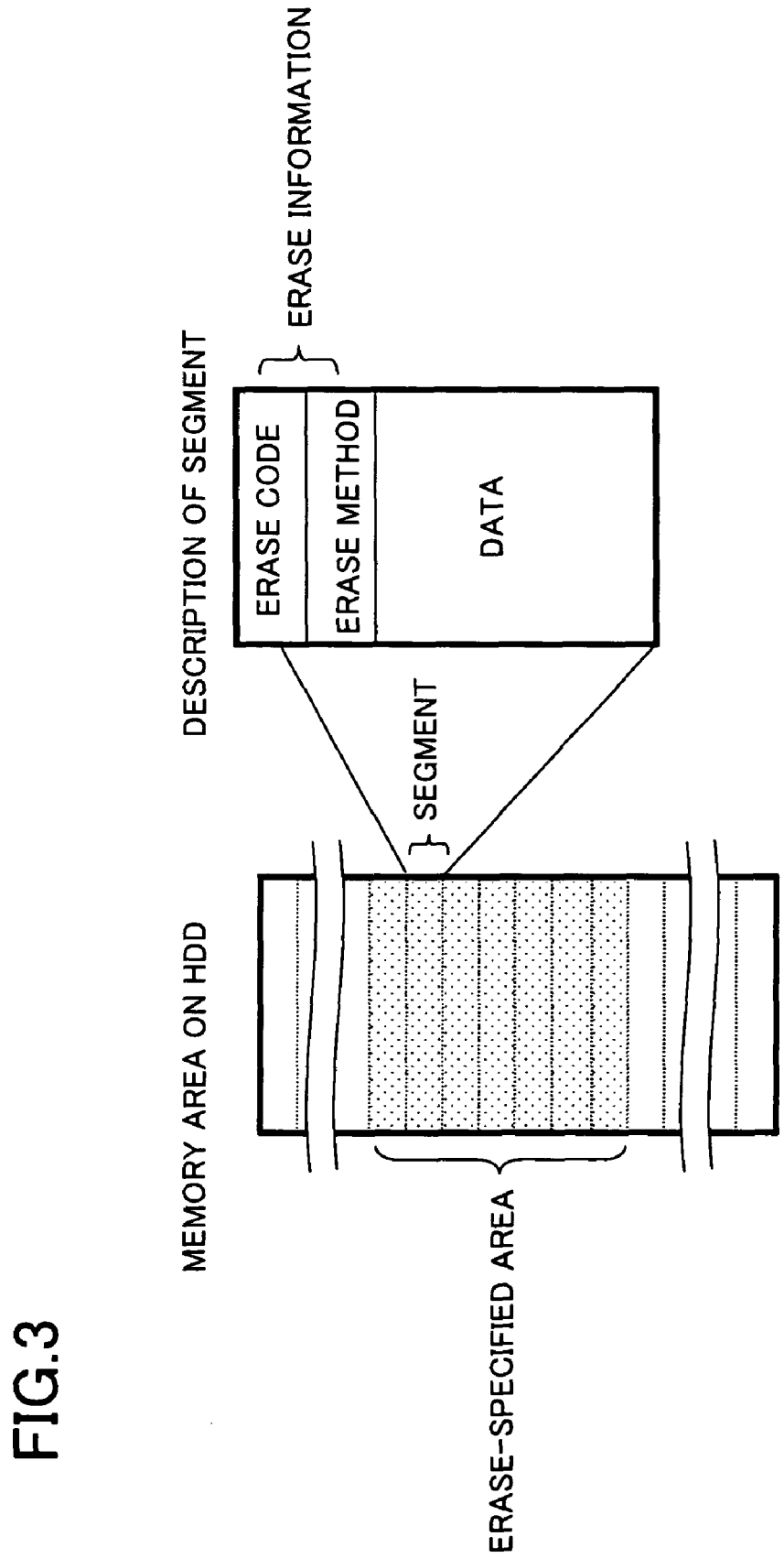
FIG. 3 illustrates details of segment partitioned by a partition unit 72.

FIG. 3 shows details of the segments that have been partitioned by the partition unit 72.

In FIG. 3, each segment partitioned by the partition unit 72 incorporates a part where data is stored and a part where the erase information is stored. In the exemplary embodiment of the present invention, an erase code and an erase method constituting the erase information are stored with respect to each segment.

Here, there is stored information in the form of erase code, indicating whether or not an erasing process has already been performed. In addition, information as to the count of already-performed overwriting, indicating how many times the overwrite erasing has been performed before, is stored in the form of erase method.

Figure 4:
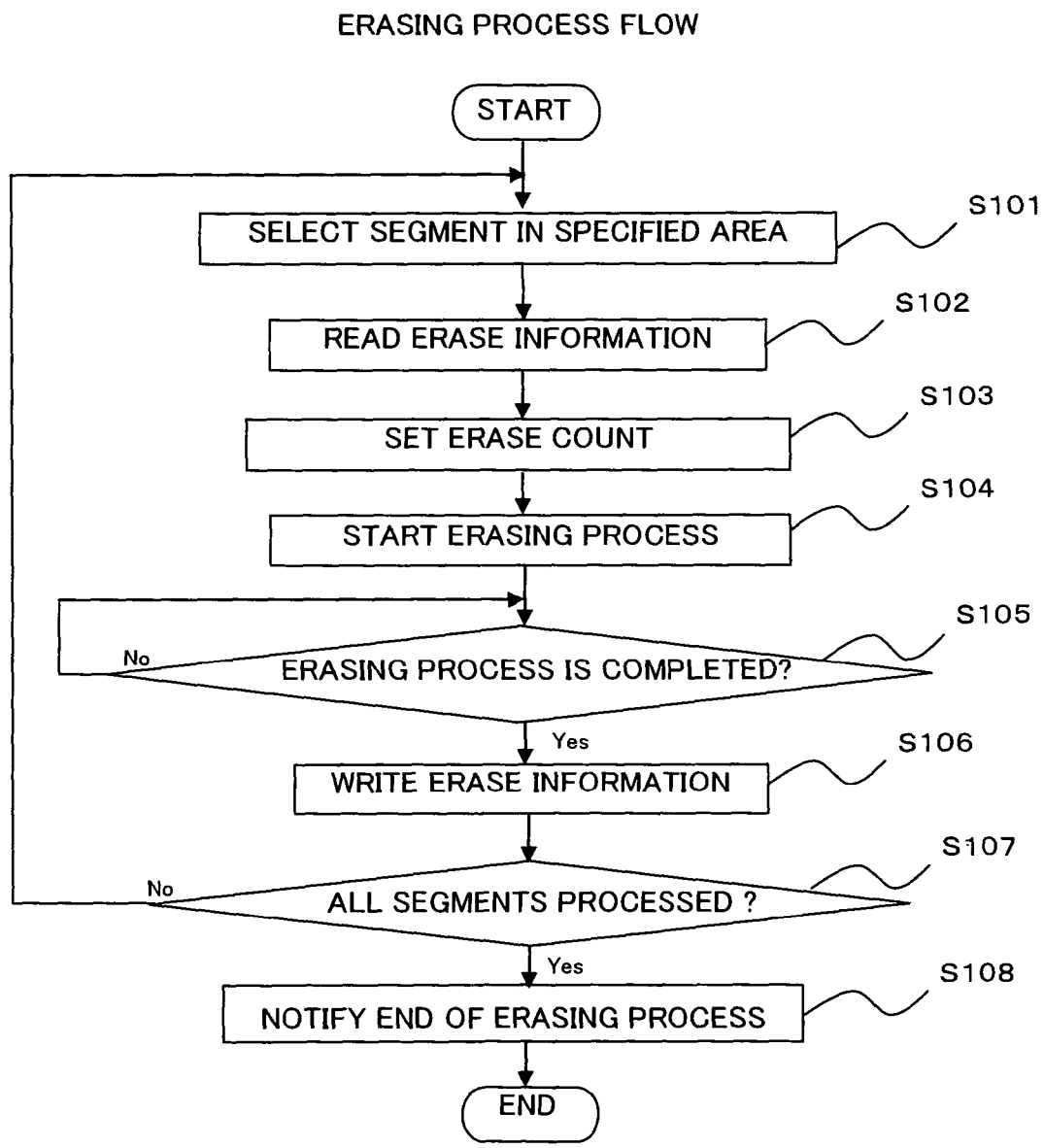
FIG. 4 is a flowchart showing an operation of the data processor according to the first exemplary embodiment of the present invention.

Next, with reference to the flowchart as shown in FIG. 4, a data processing method in the data processor 70 according to the exemplary embodiment of the present invention will be explained. In this example, an explanation will be made assuming that the count of overwriting is defined as three times. It is further assumed that, as an initial value of the erase information, the erase code stores information indicating no erasing process has been performed so far, and the erase method stores information indicating the count of overwriting is set to zero.

When the data on the HDD 90 becomes unnecessary, the CPU 10 issues a directive to the data processor 70 to erase data in a specified area in the HDD 90. Upon receipt of the directive from the CPU 10 to perform erasing, the data processor 70 starts the erasing process.

(1) The data processor 70 partitions the erase-specified area into multiple segments by the partition unit 72, and selects one segment from the multiple segments (S101).

(2) Then, the erase unit 74 of the data processor 70 reads out the erase information recorded on the head of the selected segment (S102).

(3) Next, the erase unit 74 identifies the erase code of the erase information, and determines whether or not the selected segment is a segment already subjected to the erasing process before. Then, if the specified segment has already been subjected to the erasing process before, information regarding the count of already-performed overwriting, being stored as the erase method, is identified, and the erasing process is performed for the number of times corresponding to a shortfall of already-performed overwriting count, compared to the count of overwriting being specified, i.e., three times (S103).

For example, in the case where the count of already-performed overwriting is twice, and the count of specified overwriting is three times, the erase unit 74 performs overwrite erasing one time, which is a difference in counts. If the selected segment has not been subjected to the erasing so far, the erase unit 74 performs the overwrite erasing three times that is specified.

(4) When the erasing process for the selected segment is completed (S105), the erase information storing unit 73 updates the erase information stored in the head of the segment that has been subjected to the erasing process (S106).

(5) Finally, when the erasing process for all the segments in the erase-specified area is completed (S107) the data processor 70 notifies the CPU 10 that the erasing process has been completed, and ends the processing (S108).

For example, when there is a directive to subject all the data in a hard disk to the overwrite erasing for three times so as to discard the hard disk, a segment having already been subjected to the overwrite erasing three times before will not be targeted for the erasing. The segment having been subjected to the overwrite erasing twice before will be subjected to the erasing only once. Therefore, compared to the case where three-times overwrite erasing is performed uniformly on the entire area, the erasing processing time can be reduced to a large extent.

Second Exemplary Embodiment

Next, a data processor according to the second exemplary embodiment of the present invention will be explained.

In the data processor according to the first exemplary embodiment as described above, the erasing process is performed for the number of times that is a difference between the count of already-performed overwriting and the specified count of overwriting. However, in the second exemplary embodiment, the erasing process for the difference is performed considering not only the count of overwriting but also a description of overwriting data.

In the data processor according to the first exemplary embodiment as described above, the erase information for each segment stores the count of already-performed overwriting as the erase information. As for the data processor according to the second exemplary embodiment, the count of already-performed overwriting and a description of dummy data used in each overwriting process are stored as the erase information.

For example, it is assumed that the data processor stores information as the erase information, including a description such as "the count of already-performed overwriting is twice", and "the first overwriting is performed with a fixed value and the second overwriting is performed with a fixed value". Under these conditions, it is also assumed that the data processor receives a directive from the CPU at the time of erasing process, indicating an erase method that "the first overwriting is performed with a fixed value and the second overwriting is performed with a random number". Then, the erase unit of the data processor performs a one-time overwriting process with a random number, which is a difference in erasing process, compared to the previous erase information.

MODIFIED EXAMPLE

In the above exemplary embodiments, an explanation has been made assuming that each segment has a fixed size. However, in the present invention, it is not limited as such, and the size of each segment may be configured to be variable. For example, the area may be partitioned by job, or by file such as image data, and erase information of each of the segments may include segmental information indicating the size of the segment. Specifically, the erase code is designed to include not only the information indicating whether or not the erasing process has been performed, but also the information indicating a final address of the segment. As thus configured, it is possible to enhance the flexibility of the method for partitioning the area.

In the above exemplary embodiments, an explanation has been made using an example that data stored in the HDD is subjected to the erasing process. In the second exemplary embodiment, however, it is not limited to the example above, and the present invention may be applied to assure erasing of data stored in another type of non-volatile memory such as flash memory, or a volatile memory.

In the exemplary embodiments above, the erase information is stored in the HDD 90 together with the data. However, it is also possible to store the erase information in a storage device different from the one storing the data. Furthermore, a storing location of the erase information is not necessarily at the head of each data item, and it is possible to integrate multiple erase information to store them in a form of one data item.

In the exemplary embodiments above, the data management information is stored in the HDD 90 at the time when data is written into the HDD 90. However, the data management data may be stored in the HDD 90 at a time different from the time when the data is written in.

In the exemplary embodiments above, an explanation is made assuming that the count of overwriting to completely erase the data to be erased is three times. However, the present invention is not limited as such. It is possible to set the count of overwriting to any number, which is required to erase the processed data. In addition, it is not necessary to preset the count of overwriting. It may be changed at an arbitrary point of time.

In addition, the dummy data may be a fixed value data or a random number data. If the overwriting process is performed more than one time, any combination of those various types of data may be available.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processor that erases data stored in a storage device, comprising an erase information storage unit that stores an erase information indicating a description of whether an erasing process has been performed on a corresponding erase-specified area, after the erasing process for the erase-specified area is performed, wherein
the erase-specified area is an area specified to be subjected to the erasing process,
the erase information is information indicating whether or not the erasing process has been performed, and a count of already-performed overwriting that indicates how many times an overwrite-erasing process has been performed, and
the erase information includes a description of dummy data used in each line of the overwrite-erasing process.

2. The data processor according to claim 1, further comprising an erase unit that performs, in response to a directive to erase a memory area of the storage device, an erasing process for the erase-specified area to erase a difference between the directed erasing process and an already-performed erasing process that is indicated by the erase information.

3. A data processor that erases data stored in a storage device, comprising:
a partition unit that partitions an erase-specified area being an area specified to be subjected to an erasing process, into multiple segments, in response to a directive to erase data, and
an erase information storing unit that stores erase information each indicating a description of the performed erasing process, corresponding to the segments, respectively, after the erasing process for the each of the segments is performed, wherein
the erase information is information indicating whether or not the erasing process has been performed, and a count of already-performed overwriting that indicates how many times an overwrite-erasing process has been performed, and
the erase information includes a description of dummy data used in each line of the overwrite-erasing process.

4. The data processor according to claim 3, further comprising an erase unit that performs, in response to a directive to erase a memory area of the storage device, an erasing process with respect to each of the segments, to erase a difference between the directed erasing process and an already-performed erasing process that is indicated by each of the erase information.

5. The data processor according to claim 3, wherein the erase information storing unit stores the erase information respectively in the segments.

6. The data processor according to claim 3, wherein, in partitioning the erase-specified area into multiple segments, the partition unit decides a size of each of the segments according to an amount of data to be stored, and each of the erase information includes area information indicating the size of each of the segments.

7. A data processing method for erasing data stored in a storage device, comprising storing an erase information indicating a description of an erasing process having been performed, corresponding to an erase-specified area, after the erasing process for the erase-specified area, being an area specified to be subjected to the erasing process, is performed, wherein the erase information is information indicating whether or not the erasing process has been performed, and a count of already-performed overwriting that indicates how many times an overwrite-erasing process has been performed, and the erase information includes a description of dummy data used in each line of the overwrite-erasing process.

8. The data processing method according to claim 7, wherein, in response to a directive to erase a memory area of the storage device, an erasing process is performed for the erase-specified area to erase a difference between the directed erasing process and an already-performed erasing process that is indicated by the erase information.

9. A data processing method for erasing data stored in a storage device, comprising:

partitioning an erase-specified area being an area specified to be subjected to an erasing process, into multiple segments, in response to a directive to erase data, and storing erase information each indicating a description of the performed erasing process, corresponding to the segments, respectively, after the erasing process for the each of the segments is performed, wherein the erase information is information indicating whether or not the erasing process has been performed, and a count of already-performed overwriting that indicates how many times an overwrite-erasing process has been performed, and the erase information includes a description of dummy data used in each line of the overwrite-erasing process.

10. The data processing method according to claim 9, wherein, in response to a directive to erase a memory area of the storage device, an erasing process is performed with respect to each of the segments to erase a difference between the directed erasing process and an already-performed erasing process that is indicated by each of the erase information.

11. The data processing method according to claim 9, wherein the erase information are stored respectively in the segments.

12. The data processing method according to claim 9, wherein, in partitioning the erase-specified area into multiple segments, a size of each of the segments is decided according to an amount of data to be stored, and each of the erase information includes area information indicating the size of each of the segments.

13. A computer readable medium storing a program causing a computer to execute a data processing method for erasing data stored in a storage device, comprising storing an erase information indicating a description of an erasing process having been performed, corresponding to an erase-specified area, after the erasing process for the erase-specified area, being an area specified to be subjected to the erasing process, is performed, wherein the erase information is information indicating whether or not the erasing process has been performed, and a count of already-performed overwriting that indicates how many times an overwrite-erasing process has been performed, and the erase information includes a description of dummy data used in each line of the overwrite-erasing process.

14. The computer readable medium storing a program causing a computer to execute a data processing method according to claim 13, wherein, in response to a directive to erase a memory area of the storage device, an erasing process is performed for the erase-specified area to erase a difference between the directed erasing process and an already-performed erasing process that is indicated by the erase information.

15. A computer readable medium storing a program causing a computer to execute a data processing method for erasing data stored in a storage device, comprising:

partitioning an erase-specified area being an area specified to be subjected to an erasing process, into multiple segments, in response to a directive to erase data, and storing erase information each indicating a description of the performed erasing process, corresponding to the segments, respectively, after the erasing process for the each of the segments is performed, wherein the erase information is information indicating whether or not the erasing process has been performed, and a count of already-performed overwriting that indicates how many times an overwrite-erasing process has been performed, and the erase information includes a description of dummy data used in each line of the overwrite-erasing process.

16. The computer readable medium storing a program causing a computer to execute a data processing method according to claim 15, wherein, in response to a directive to erase a memory area of the storage device, an erasing process is performed with respect to each of the segments, to erase a difference between the directed erasing process and an already-performed erasing process that is indicated by each of the erase information.

17. The computer readable medium storing a program causing a computer to execute a data processing method according to claim 15, wherein, the erase information are stored respectively in the segments.

18. The computer readable medium storing a program causing a computer to execute a data processing method according to claim 15, wherein, in partitioning the erase-specified area into multiple segments, a size of each of the segments is decided according to an amount of data to be stored, and each of the erase information includes area information indicating the size of each of the segments.

* * * * *